United States Patent
Bettinardi

(10) Patent No.: US 6,731,326 B1
(45) Date of Patent: May 4, 2004

(54) LOW VISION PANNING AND ZOOMING DEVICE

(75) Inventor: Edward R. Bettinardi, Littleton, CO (US)

(73) Assignee: Innoventions, Inc., Conifer, CO (US)

( * ) Notice: Subject to any disclaimer, the term of this patent is extended or adjusted under 35 U.S.C. 154(b) by 0 days.

(21) Appl. No.: 09/539,965

(22) Filed: Mar. 31, 2000

Related U.S. Application Data

(60) Provisional application No. 60/127,911, filed on Apr. 6, 1999.

(51) Int. Cl.[7] .......................... H04N 7/18; G03B 13/00; G06K 9/00
(52) U.S. Cl. .......................... 348/63; 348/345; 382/114
(58) Field of Search .............................. 348/62, 63, 64, 348/345, 98, 218.1, 53; 345/13, 422; 204/192.3; 382/114; 250/334; 235/462.42

(56) References Cited

U.S. PATENT DOCUMENTS

| | | | |
|---|---|---|---|
| 4,928,170 A | 5/1990 | Soloveychik et al. | |
| 5,325,123 A | 6/1994 | Bettinardi | 348/62 |

(List continued on next page.)

FOREIGN PATENT DOCUMENTS

| | | | |
|---|---|---|---|
| DE | 2516191 | 10/1976 | G06K/15/20 |
| EP | 0 246 010 A1 | 4/1987 | G06F/15/62 |
| EP | 0358573 | 3/1990 | G06F/15/62 |
| EP | 0 838 751 A2 | 7/1997 | G06F/3/033 |
| EP | 0838751 | 4/1998 | G06F/3/033 |
| JP | 0246010 | 8/1989 | G06F/15/62 |
| WO | WO98/46014 | 10/1998 | H04N/5/262 |

OTHER PUBLICATIONS

Internet Advertisement : GyroPoint Product Family; Gyration, Inc., www.gyration.com.

(List continued on next page.)

*Primary Examiner*—Gims Philippe
(74) *Attorney, Agent, or Firm*—Cochran Freund & Young LLC

(57) ABSTRACT

Disclosed are several embodiments of panning and zooming devices that may assist individuals with low vision. The present invention employs imaging devices that capture an image and then select a smaller portion of the image for full display. The size of the selected portion of the captured image determines the magnification that is achieved. Further, different portions of the captured image can be selected to provide for panning of the image. In this fashion, a stationary mounted camera can be used which allows an image to be both panned and zoomed. Further, automated techniques can be used for panning and zooming control. Small aperture optics are used so that images can be focused for a large depth of field which allows the present invention to be employed without the necessity for using expensive optical focusing techniques. Electrical zooming and panning also allows the device of the present invention to be employed for both writing on and reading a document. Any desired types of displays such as cathode ray tube displays, flat panel displays, projection displays, etc. can be employed. Also disclosed is an electronic telescope/microscope that provides a bright image that can be zoomed to provide different magnifications. Another embodiment utilizes eyewear having displays mounted in front of the users eyes and a camera mounted on the eyewear. A large field of view allows the user to pan the image captured by the camera so that the user does not have to utilize head movements to direct the image that is displayed on the eyewear. A mechanical support is also disclosed that utilizes rollers to allow the user to position a camera at a predetermined height over a document and to physically pan across the document. The camera can employ a zoom controller to adjust the size of the image.

19 Claims, 9 Drawing Sheets

U.S. PATENT DOCUMENTS

| | | | |
|---|---|---|---|
| 5,461,416 A | | 10/1995 | Bettinardi ..................... 348/62 |
| 5,586,196 A | * | 12/1996 | Sussman ..................... 382/114 |
| 5,686,960 A | * | 11/1997 | Sussman et al. ......... 348/218.1 |
| 5,729,283 A | | 3/1998 | Meyer et al. |
| 5,739,870 A | | 4/1998 | Simpson ..................... 348/628 |
| 5,756,981 A | * | 5/1998 | Roustaei et al. ....... 235/462.42 |
| 5,777,715 A | | 7/1998 | Kruegle et al. |
| 6,040,808 A | * | 3/2000 | Knox et al. .................... 345/13 |
| 6,535,250 B1 | * | 3/2003 | Okisu et al. ................ 348/345 |

OTHER PUBLICATIONS

Internet Advertisement: On–Trak Detector Amplifiers; On–Trak Photonics, Inc., 22471 Aspan St., Lake Forest, CA 92630.

Catalog: "LightCasterProduct Specifications"; DisplayTech, 2602 Clover Basin Drive, Longmont, CO 80503–7603.

Press Release: "NoHands Mouse"; Hunter Digital, 11999 San Vincente Blvd., Suite 440, Los Angeles, CA 90049.

Brochure for pointing devices from Madentec Ltd., 3022 Calgary Trail South, Edmonton, AB T6J 6V4.

Internet Advertisement: "HeadMouse"; Origin Instruments Corporation, 854 Greenview Drive, Grand Prarie. TX 75050.

* cited by examiner

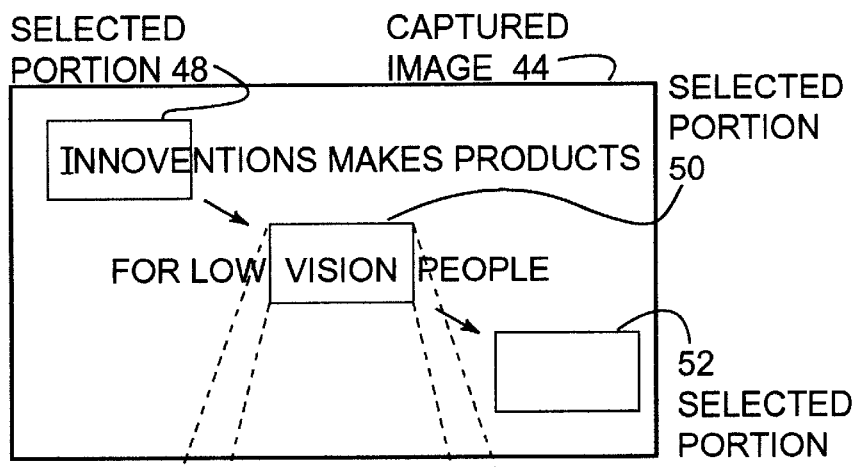

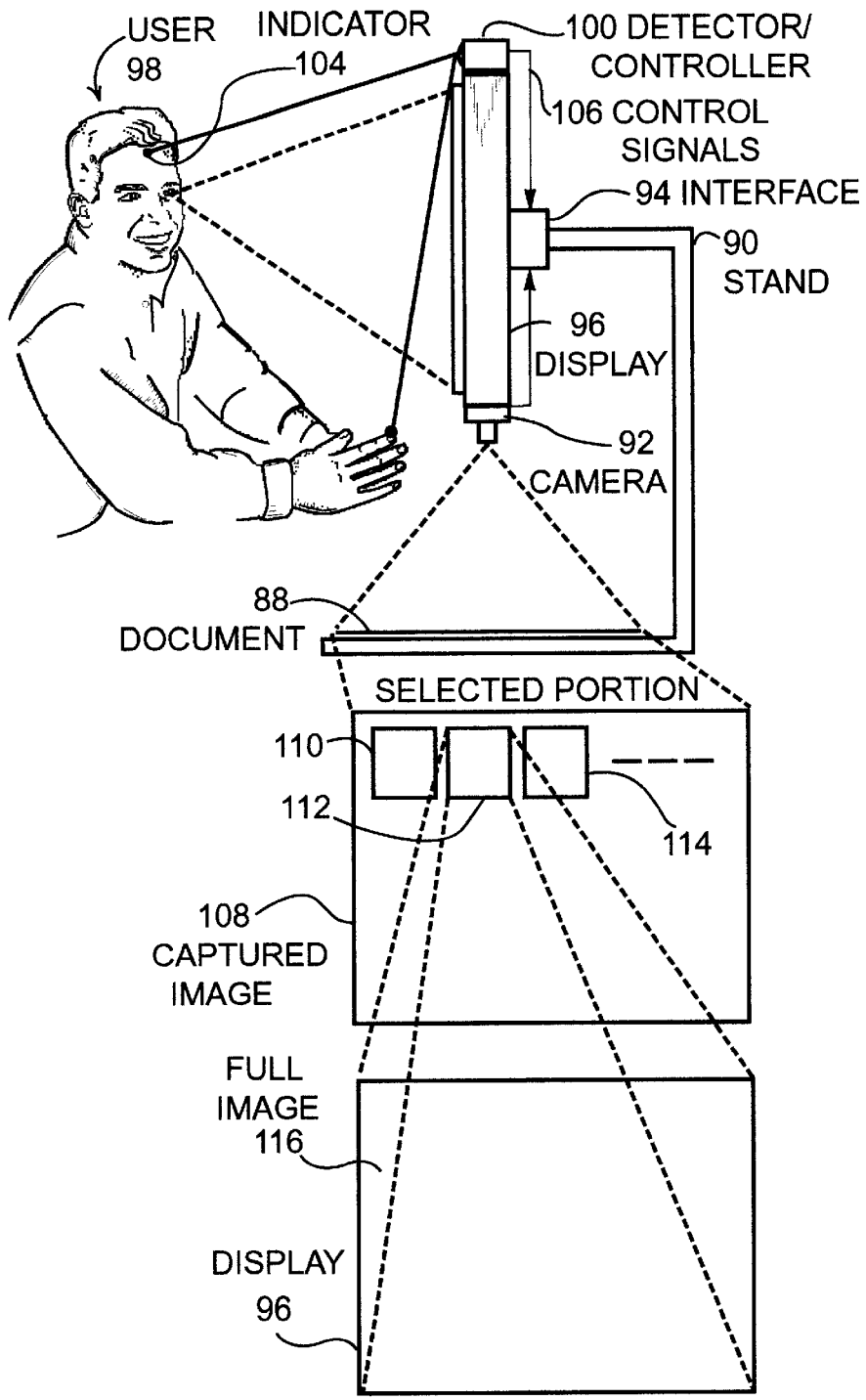

LOW VISION PANNING AND ZOOMING DEVICE

CROSS-REFERENCE TO RELATED APPLICATIONS

This application claims the benefits of provisional application Serial No. 60/127,911, filed Apr. 6, 1999, entitled "LOW VISION PANNING AND ZOOMING DEVICE".

BACKGROUND OF THE INVENTION

A. Field of the Invention

The present invention pertains generally to methods and devices for aiding perception of people with low vision and more particularly to electronic devices that are capable of panning and zooming.

B. Description of the Background

Perception of objects, and particularly documents with printed matter, by people having low vision can be aided by providing displays that increase the size of the perceived object. For example, Innoventions, Inc. of Littleton, Colo., provides a hand held small aperture camera device that has a long depth of field that can be used to image printed documents and display those documents on a standard television display as disclosed in U.S. Pat. No. 5,325,123 issued Jun. 28, 1994 and U.S. Pat. No. 5,461,416 issued Oct. 24, 1995. These devices have been very useful in assisting individuals that have low vision in reading documents, especially documents with very small print. The user can adjust the magnification by changing the distance between the object being imaged and the hand held small aperture camera device without the necessity of adjusting the focus of the camera. It would be desirable, however, to be able to utilize this device for writing as well as for reading. Also, it would be advantageous to have a device that is capable of allowing the user to scan across a document while maintaining a predetermined distance from the document. Further, reading devices such as this require physical movement of either the camera or the document to scan text on the document. It would therefore be advantageous to provide a device that allows a user to electronically pan across a document and electronically adjust the magnification of the resultant image without the necessity of physically moving the document or the camera.

Various other devices exist for aiding people having low vision in various tasks, such as visual recognition at both short and long range. For example, many people having low vision use aspheric magnifying lenses to read print that is otherwise indiscernible to them. Aspheric magnifying lenses have the advantage of being very portable. They are, however, somewhat difficult to learn to use and provide a limited amount of magnification. To increase the magnification of the aspheric portable magnifying lenses, the radius of the lens must become shorter. For magnifications greater than approximately ten, these types of magnifying lenses become impractical.

Portable low vision devices have also been developed that utilize video camera technology. Devices such as these have used stationary mounted cameras that are mounted on a fixture that is worn on the user's head such as a helmet. Such devices, however, have not been successful products for use as portable low vision aids for various reasons. Such devices tend to be very bulky requiring the use of a helmet or other fixtures that are unsightly to wear. Although such devices are capable of providing an enlarged image, usually that image is a fixed image since the camera is mounted in a fixed position on the user's head mounted fixture. As such, the user must move their head to be able to adjust the viewing direction. For these reasons, users consider these types of devices cumbersome and unwieldy and such devices have not been readily accepted for use by people with low vision. It would therefore be advantageous to provide a portable low vision aid that is not bulky or unsightly and allows the user to adjust both the magnification and viewing angle of the user without requiring the user to turn his or her head.

Telescopes have also been used to aid people having low vision. Standard optical telescopes, however, are difficult to use and normally provide a narrow viewing angle. Stabilization of the image at narrow viewing angles is difficult and limits the use of these devices. It would therefore advantageous to also provide a device that is capable of providing an image having a wide field of view and that is capable of providing varying degrees of magnification for viewing objects at both close and far distances without the need for expensive or complex focusing techniques.

SUMMARY OF THE INVENTION

The present invention overcomes the disadvantages and limitations of the prior art by providing various embodiments for aiding individuals with low vision. In one embodiment, the present invention allows a long depth of field imaging device to be mounted on a stand to allow the user to employ the long depth of field device for aiding the user in reading and writing. In another embodiment, the present invention provides a device that employs a stationary mounted camera to view a document and allows the user to pan across the document and zoom to different magnification levels using either automated or manual controls. In accordance with another embodiment, the present invention provides a portable device that uses a camera and display optics that are mounted on a conventional type of eyewear that allows the user to pan across the field of view of the image and to adjust the zoom or magnification of the device using a manual control mechanism. A further embodiment of the present invention provides an electronic telescope/microscope (scope) that is capable of providing a bright high contrast image with variable magnification that does not require complex focusing techniques.

The present invention may therefore comprise a method of generating a magnified image of a document that has a selectable magnification and electronically panning the image to assist a user in reading the document comprising the steps of mounting a camera in a position to generate an image of the document; selecting portions of the image at different locations within the image to pan across the image; selecting the portions of the image such that the portions have different sizes that determine the selectable magnification; supplying missing pixels for the portions of the image; displaying the magnified image for reading by the user.

The present invention may further comprise a method of viewing objects with an electronic scope comprising the steps of providing a detector matrix on a first end of a housing of the scope; focusing an image on the detector matrix; selecting a portion of the image using a zoom controller; displaying the portion of the image as a full image on a display located on a second end of the scope; supplying missing pixels of the full image.

The present invention may further comprise a portable viewing device that generates an enlarged image comprising eyewear adapted to be worn over the eyes of a user; a camera mounted on the eyewear that captures an image; displays mounted in the eyewear adjacent the eyes of the user for producing the enlarged image; a controller that generates control signals relating to panning and magnification of the image captured by the camera; an interface connected to the controller and the displays that selects specific portions of the image captured in response to the control signals to pan the image captured by the camera and to display the enlarged image on the displays with different magnitudes of magnification.

The present invention may further comprise a method of generating an enlarged image in a portable viewing device comprising the steps of capturing an image generated by a detector that is mounted on eyewear that is adapted to be worn by a user; selecting portions of the image captured by the detector in response to control signals generated by a controller to produce a full image display signal that has a magnification that is proportional to the size of the portions of the image selected by the control signals and has a panning location that corresponds to the location of the portions in the image captured by the detector; displaying the full image display signal or displays mounted on the eyewear adjacent to the eyes of the user.

The present invention may further comprise a method of maintaining a substantially constant height of a small aperture camera that is scanned across a document comprising the steps of attaching a mounting plate to the camera; pivotally attaching two arms to the mounting plate with hinges that provide sufficient friction to support the camera such that the two arms cross and overlap; attaching rollers to the two arms to allow the arms to roll across the document.

The present invention may further comprise a support for a small aperture camera that allows the small aperture camera to be moved across a document at a substantially constant height comprising a mounting plate that is adapted to be attached to the camera; a pair of hinges attached to the mounting plate that provide sufficient friction to support the camera; a pair of arms attached to the hinges in an overlapping crossed relationship; a pair of rollers attached to the arms that allow the camera to roll across the document at a substantially constant height.

The advantages of the present invention are that a small aperture camera can be used having a long depth of field that is also capable of electronic panning and zooming of an object without the need to physically move the camera or object, or provide additional focusing. Either manual or automated procedures for panning and zooming can be employed. Further, these concepts can be employed in a portable device that is worn like a pair of glasses for allowing the user to perceive an enlarged image which can be electronically panned and zoomed. This eliminates the necessity for awkward movements by the user to direct the camera in a direction for viewing and provides for an aesthetic device that can be easily and worn and used. Additionally, the present invention can be embodied in an electronic scope that allows the user to view objects at both long and close distances with variable magnification and without the need to adjust the focus of the device. As such, it provides a handy portable device that is easy to use.

BRIEF DESCRIPTION OF THE DRAWINGS

FIG. 3 is a schematic illustration of a captured image.

FIG. 4 is a schematic illustration of a full image that is displayed on the displays of the present invention.

FIG. 7 is a schematic illustration of another embodiment of the present invention.

FIG. 8 is a schematic illustration of a captured image.

FIG. 9 is a schematic illustration of a full image that is produced on the display of FIG. 7.

DETAILED DESCRIPTION OF THE PREFERRED EMBODIMENT

Figure 1:
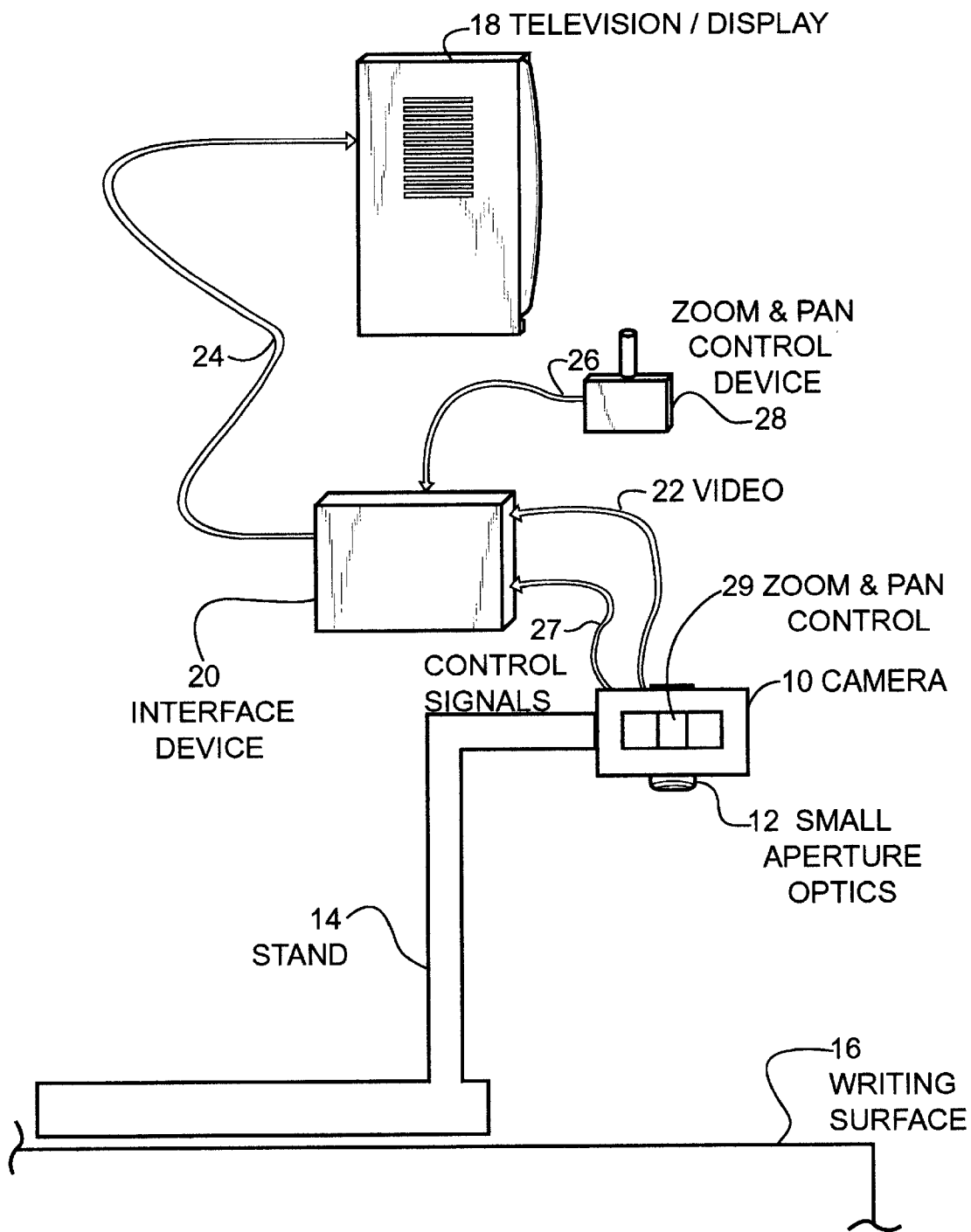
FIG. 1 is a schematic diagram of one embodiment of the present invention.

FIG. 1 is a schematic illustration of one embodiment of the present invention. In accordance with this embodiment, a camera or other type of detector that is capable of generating an image is used that has small aperture optics. This allows the camera 10 to focus over a long depth of field. A typical camera for use in accordance with this embodiment is sold by Innoventions, Inc. 5921 South Middlefield Road, Suite 102, Littleton, Colo. 80123-2877. The camera 10 may include an illumination source on its lower surface to help in illuminating an object such as a document to be read. The camera 10 is mounted on a stand 14 that holds the camera 10 above a writing surface 16. Any document or object that the user desires to view can be placed on the writing surface 16 in alignment with the camera 10. The writing surface 16 allows the user to write on the document or object while simultaneously being able to view an enlarged image of that object on television 18. Television 18 can comprise a standard television or any type of viewing device such as a monitor, flat panel display, projection display, etc., that is capable of displaying an enlarged image of the object that is being viewed by camera 10. The magnification of the image is determined by dividing the field of view of the display 18 by the field of view of the camera 10. Hence, increasing the size of the display 18 and decreasing the size of the field of view of the camera 10 will increase the magnification. With standard print in the range of 10 point to 14 point, it has been determined that ability to view 1 inch of a document placed on writing surface 16 provides the necessary context information to allow the user to read the document. If the camera 10 is held at 18 inches above the writing surface 16, this results in a view angle of approximately 3 degrees. If the television display 18 provides a field of view of 45 degrees, that results in a magnification of 15×.

As also shown in FIG. 1, an interface device 20 is provided that receives the standard video signal 22, which comprises a 1 volt peak to peak standard video signal, and transforms that into a display signal 24 that is applied to television 18. Interface device 20 may up—convert the signal to a standard carrier band frequency for display on channels 3 or 4 of the television 18.

In addition, the interface device 20 of FIG. 1 may provide an amplified standard video signal that can be applied to monitor inputs of the display 18. Interface device 20 may also include processing capabilities to processes control signals 26 that are generated by the zoom and pan control device 28. The zoom and pan control 28 can comprise any desired type of manual device for generating control signals for zooming and panning the image. For example, zoom and pan control device 28 can comprise a joy stick, a finger slide device, a mouse, or any other type of manual control device. Further, the zoom and pan control device 29 can be built into the housing of camera 10. The zoom and pan control device 28 generates the control signals 26 that indicate the zoom and pan that is desired by the user. The zoom and pan control device generates control signals 27 that are transmitted from camera 10 to the interface device 20.

The term "zoom" in this case is used to mean the variable magnification that can be selected by the user in a fashion similar to a zoom lens. As explained in more detail below with regard to FIGS. 3 and 4, the amount of magnification or "zoom" that is selected by the user is achieved by selecting a subset of pixels of the image generated by camera 10 for display as a full display on television 18. Since the subset of pixels has a certain field of view that is less than the entire field of view of the camera 10, a magnified image can be generated. A large subset of pixels will produce an image that has greater magnification than the image produced by the entire camera field of view 10, while a smaller subset of pixels will produce an enlarged image of even greater magnification.

The panning control provides the panning signals that determine the location of the selected subset of pixels on the image captured by the camera 10. As indicated above, this is explained in more detail with regard to FIGS. 3 and 4 below. The panning device may locate the pixel subset in two dimensions on the image generated by the camera 10. If a joystick type of device is used, the selected portion of the image may be determined by moving the joystick in both the forward and back directions as well as side to side directions to locate positions on the captured image in two directions. Zooming may be achieved, for example, by rotating the joystick in a clockwise or counter clockwise direction or by using an additional joystick or other manual control device. In this fashion, the document that is placed on the writing surface 16 can be panned and zoomed to locate and magnify any desired portion of the document.

Figure 2:
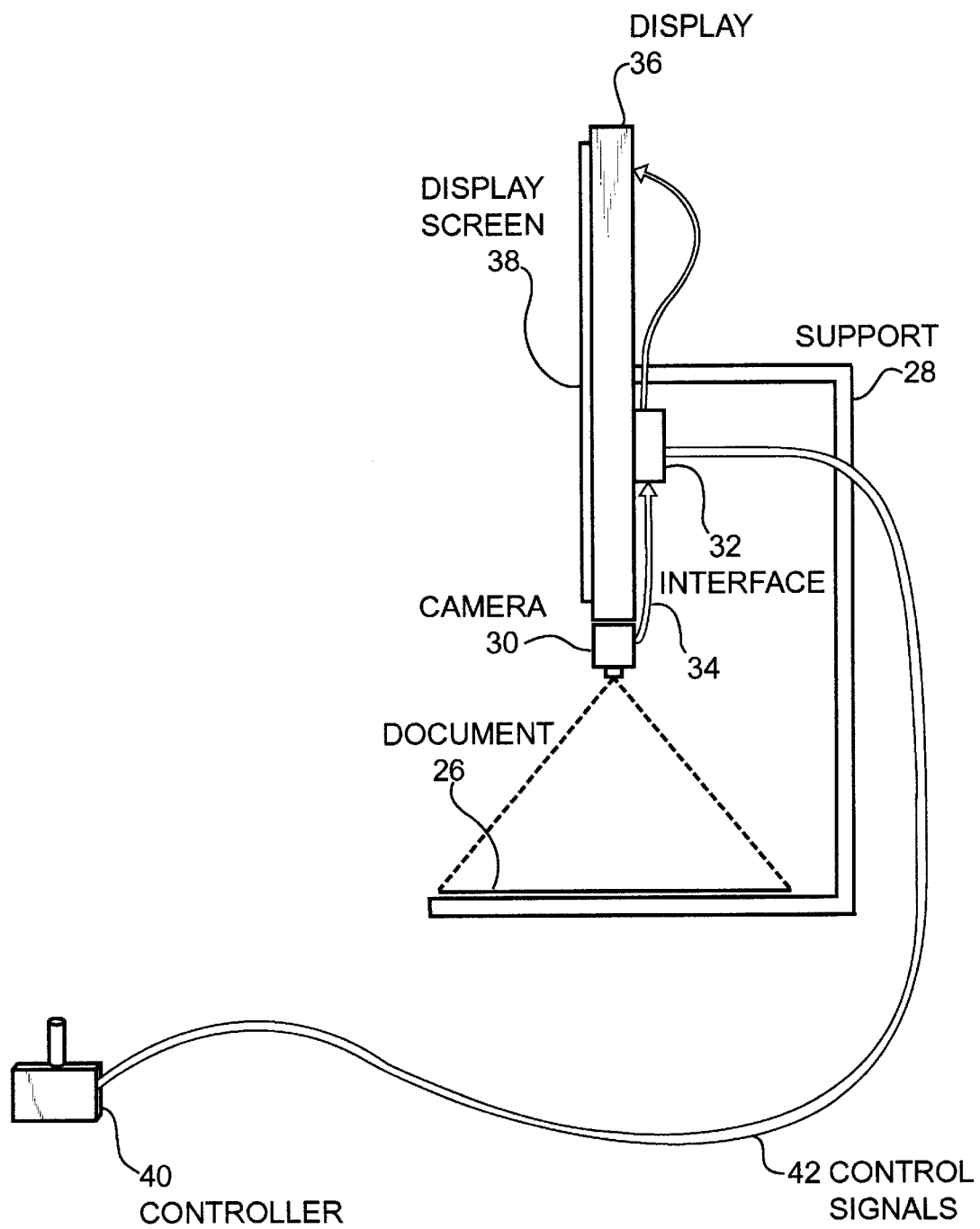
FIG. 2 is a schematic illustration of another embodiment of the present invention.

FIG. 2 is a schematic illustration of another embodiment of the invention. As shown in FIG. 2, a document 26 is placed on the bottom portion of a support device 28. The document 26 is aligned with a camera 30 that generates an image of the document 26. The image is then transferred to an interface device 32 via connector 34. The support 28 supports a display device 36, such as a flat panel display, having a display screen 38. Display 36 can comprise any type of desired display including flat panels, cathode ray tube displays, projection displays, etc. Interface device 32 is shown as mounted on the back of the display 36 but can also be mounted on the support 28. The embodiment of FIG. 2 also includes a controller 40 that generates control signals 42 that are applied to the interface device 32. As indicated above, these control signals control the panning and zooming of the image generated by the camera 30. In this fashion, portions if the document can be panned and magnified to a desired level to aid in reading of the document 26.

FIGS. 3 and 4 illustrate the manner in which panning and zooming may be performed in accordance with the present invention. FIG. 3 illustrates the captured image 44 that is captured by the camera 30 (FIG. 2) or the camera 10 (FIG. 1). The captured image 44 is the entire image that is captured by the camera and is dependent upon the field of view of the camera. As indicated above, the field of view of the camera divided into the field of view of the display device determines the magnification that can be obtained. Of course, with regard to the display device illustrated in FIGS. 1 and 2, the field of view of the display device is dependent upon how close the user is positioned to the display. In other words, if the user is closer to the display, the letters projected on the display will appear larger. With regard to the embodiments of FIGS. 10 and 11, as disclosed below, the distance of the users eye from the display is substantially fixed which fixes the field of view of the display for the user.

The captured image 44 of FIG. 3 comprises a plurality of pixels that create the captured image. In most cases, the pixel images are arranged in rows and columns within the borders of the captured image 44. FIG. 4 illustrates the manner in which portions of the captured image can be selected for viewing as a full image 46. Referring again to FIG. 3, a portion of the captured image 44 can be selected as illustrated by selected portion 48. The selected portion 48 comprises a subset of the pixels of the captured image 44. The selected portion 48 has the same format and ratio as the captured image 44, but merely defines a subset of the larger set of the pixels of the captured image 44. Selected portion 50 indicates another subset of pixels in the captured image 44. Similarly, selected portion 52 is another subset of the pixels of the captured image 44. By sequentially selecting these selected portions, using a controller, the user can pan across the captured image 44, as shown in FIG. 3. The panning shown in FIG. 3 shows that the selected portions start with selected portion 48, pans to selected portion 50 and then pans to selected portion 52. As shown, the panning is performed in two dimensions. Of course, if a document is being read, the user may wish to just pan across in the horizontal direction of the captured image 44 to read the words in the row as illustrated in FIG. 3, rather then panning in two directions at once. Once a line of text has been read, the selected portion may then be move to the next line of print and panned across in a horizontal direction across that line of print.

As shown in FIG. 4, the selected portion 50 (FIG. 3) is displayed as a full image 46 that is a magnified or enlarged version of the captured image 44. This is displayed on one of the displays 18, 36 of FIGS. 1 and 2, respectively. As can be seen, if the selected portions 48, 50, 52 are made smaller, a greater magnification or a more enlarged image can be generated on the display 18, 36. If the selected portions 48, 50, 52 are made larger the magnification of the image on display 18, 36 is decreased. In this fashion, the size of the selected portions determines the amount of magnification or zoom that is created. In other words, the selected portions 48, 50, 52 have a smaller angular field of view than the larger captured image 44. This smaller field of view, when divided into the field of view of the display screen 38 generates an indication of the magnification that is obtained. Similarly, the magnification of the selected portion over the magnification of the captured image can be obtained by dividing the field of view of the captured image by the field of view of the selected portion. As shown in FIG. 3, the field of view of each of the selected portions 48, 50, 52 is approximately one-fourth of the field of view of the captured image 44. As shown in FIG. 4, the full image 46 displays the selected portion 50 at approximately 4× to 4.5× the size of the captured image 44.

Since the selected portions 48, 50, 52 of FIG. 3 are a subset of the pixels of the captured image 44, additional pixels must be generated to produce a full image 46 on the displays 18, 36 as illustrated in FIG. 4. The generation of additional pixels can be performed by any desired technique including duplication of neighboring pixels, interpolation techniques, etc. Interpolation can be performed in two dimensions on the display 18, 36 by standard interpolation techniques, such as disclosed in U.S. Pat. No. 5,739,870, issued Apr. 14, 1998, and the patents that are cited therein. The video scaling that is shown in FIGS. 3 and 4 comprises standard techniques that can be incorporated in software or hardware, and is more fully disclosed below with respect to FIG. 6.

Figure 5:
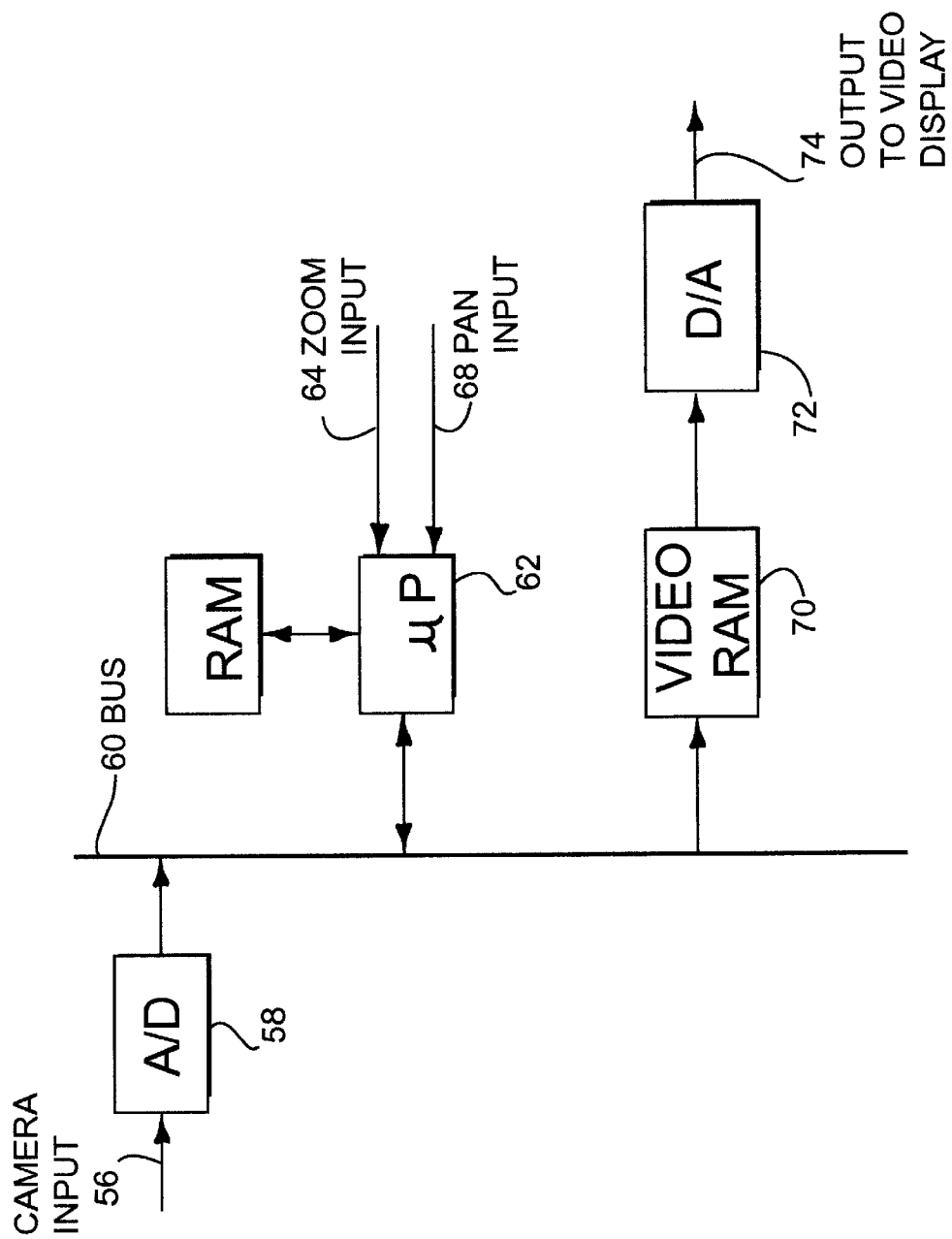
FIG. 5 is a schematic block diagram of the architecture of the interface device.

FIG. 5 is a schematic block diagram of one example of implementing the hardware of the interface device 20 of FIG. 1 and interface device 32 of FIG. 2. As shown in FIG. 5, a camera input 56 is received from the camera and is applied to an analog to digital converter 58. The A/D converter 58 digitizes the video stream 56 which is then transmitted to the bus 60. The combined video signal 56 may also include horizontal and vertical sync information that is also digitized and applied to the bus 60. Microprocessor 62 retrieves this data from a bus 60 and processes this data in accordance with the zoom input 64 and the pan input 68. Microprocessor 62 selects the location and size of the selected portions in accordance with the zoom input 64 and pan input 68 and then generates interpolated values for missing pixels. This information is then stored in the video RAM 70. The video RAM output 70 is applied to a digital to analog converter 72 which generates an analog output that is sent to the video display. Of course, FIG. 5 illustrates only one particular manner of implementing the present invention. Programmed gate arrays or digital signal processors (DSPs) can be used to perform these functions.

Figure 6:
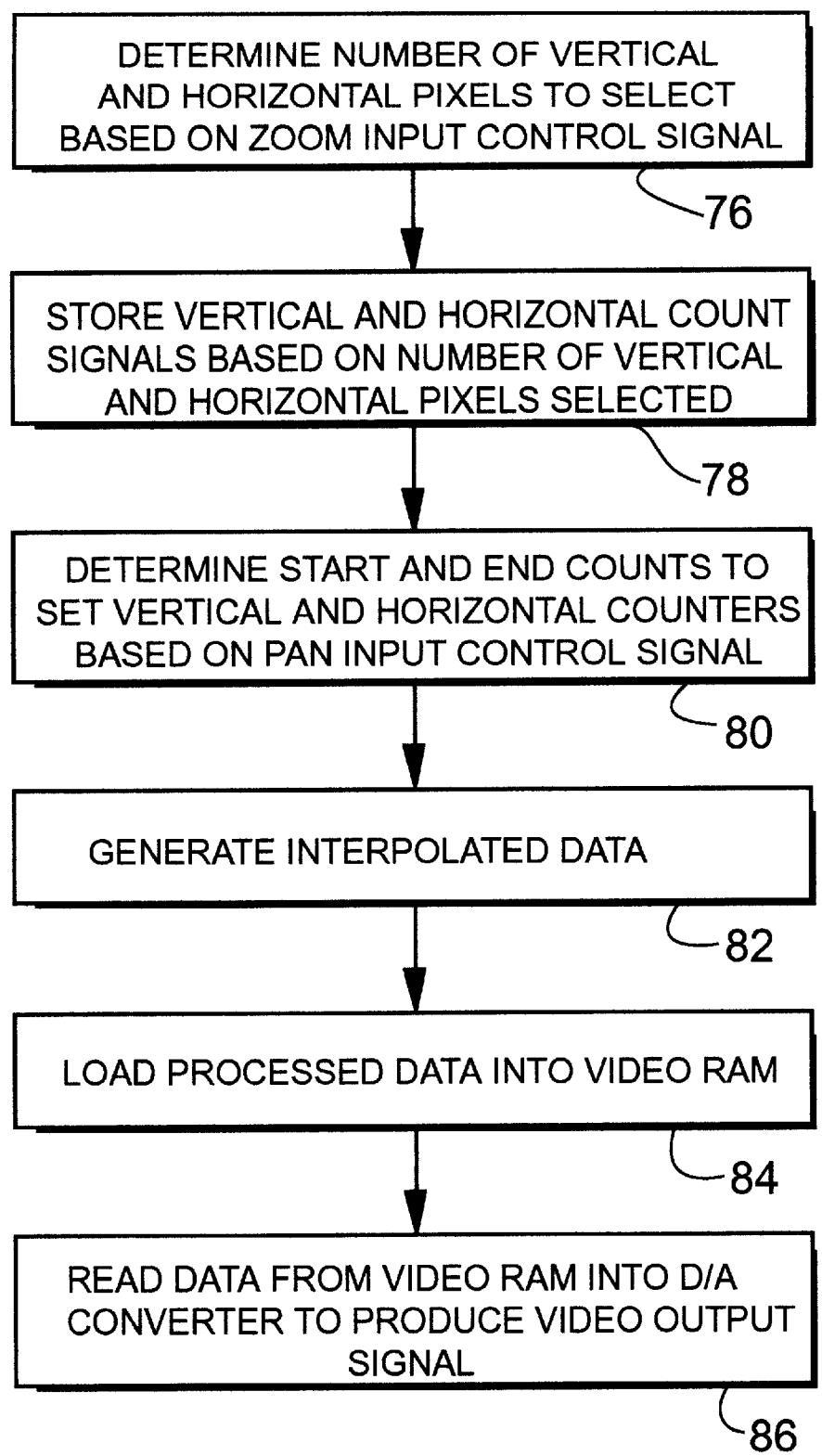
FIG. 6 is a flow diagram of the steps performed by code by the microprocessor of the interface device.

FIG. 6 is a schematic flow diagram of the steps that may be performed by program code that is utilized in conjunction with the architecture of FIG. 5. As shown at step 76, the microprocessor determines the number of vertical and horizontal pixels that are selected based on the zoom input. The zoom input provides a control signal that indicates the size of the selected portion of the image. That control signal is used by the microprocessor to determine the number of pixels (count signals) that are to be selected from the captured image. At step 78, the count signals are then stored by the microprocessor based upon the number of vertical and horizontal pixels that are selected by the zoom input. In other words, the pixel count for the size of the selected portion is generated in step 76 and that pixel count is then stored in memory at step 78. At step 80, the pan input generates a control signal that indicates a starting point of the selected portion in both the vertical and horizontal directions of the selected portion. This can constitute an actual pixel count in the horizontal direction and scan line count in the vertical direction. These starting points are then used in conjunction with the vertical and horizontal counts signals that are stored in step 78 to set vertical and horizontal counters that count the vertical and horizontal size of the selected portion of the captured image. At step 82 of FIG. 6, interpolated data is then generated in accordance with standard interpolation techniques as disclosed above. The interpolated data provides the missing pixels for the selected portions that are to be displayed as a full image, as indicated in FIG. 4. At step 84, the microprocessor loads the processed data, including the selected pixel elements of the selected portions along with the interpolated data into the video RAM 70 (FIG. 5). Data is then read from the video RAM into a D/A converter 72 to produce the video output signal at step 86.

FIG. 7 is a schematic illustration of another embodiment of the present invention. The embodiment in FIG. 7 is similar to the embodiment of FIG. 2 with the exception that it uses an automated control device rather than a manual control device. As shown in FIG. 7, a document 88 is placed on the lower portion of the stand 90 in alignment with a camera 92. The camera 92 generates an image of the document 88 that is transmitted to an interface device 94. The interface device 94 generates a video signal that is applied to the display 96 for viewing by the user 98. FIG. 7 also includes an automatic detector/controller 100 that is capable of detecting an indicator such as indicator 102 that is mounted on the head of the user 98 or indicator 104 that is mounted on the user's finger or other part of the user's body. The detector/controller 100 is capable of detecting movements of the indicator and generating control signals 106 in accordance with those movements. These types of optical detectors are typically referred to as a head mouse or finger mouse. These devices translate the movements of a user's head or finger into directly proportional movements of a cursor on the screen. In this manner, a user may select a portion of the document to be read and then be able to pan across the document by moving the user's head or finger. The head mouse and finger mouse products use an infrared device that illuminates the reflective indicator. The detector/controller camera 100 then tracks the position of the reflective point to pan a cursor across the screen to indicate the starting point of the selected portion. For example, the cursor control signal may indicate the upper left hand of the corner of the selected portion. Alternatively, two separate inputs can be generated based upon indicator 102 and indicator 104. In that instance, one of the inputs could be used to control the zoom of the image that is generated while the other control signal can be used to control the panning of the image. These types of devices are available from several different manufacturers. For example, Origin Instruments Corp. of Grand Prairie Tex. provides a head mouse device. Similarly, MadenTec of Edmonton, Alberta provides a similar head mouse device. GyroPoint Inc. of Saratoga, Calif., provides a pointer device that uses a wireless communication connection to generate control signals. Similarly, a foot controlled mouse can also be used to generate control signals. A typical foot mouse in marketed by Hunter Digital of Los Angeles, Calif.

FIG. 8 is a schematic illustration of the captured image 108 that is captured by the camera 92 (FIG. 7). As shown in FIG. 8, selected portions 110, 112, 114 are shown as portions that are panned in a horizontal direction across the captured image 108.

FIG. 9 illustrates the manner in which the selected portion 112 (FIG. 7) is displayed as a full image 116 on the display 96. In this fashion, an enlarged and panned image can be generated in the same manner as indicated above.

Figure 10:
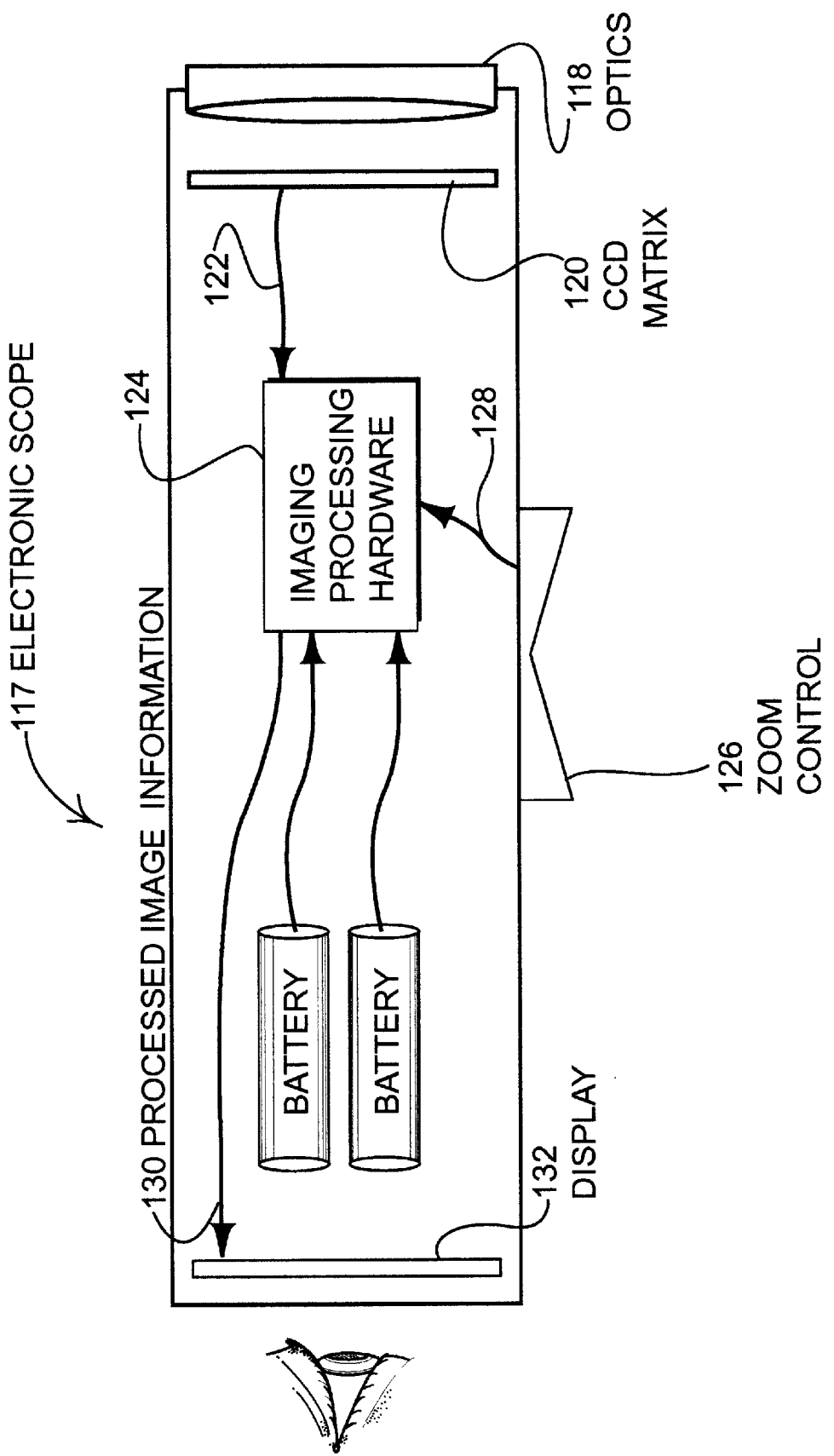
FIG. 10 is a schematic illustration of the electronic scope of the present invention.

FIG. 10 is a schematic illustration of a electronic scope that is capable of viewing and generating enlarged images at both short and long distances. The embodiment of FIG. 10 uses optics 118 that include focusing optics as well as a small diameter aperture (not shown) that is capable of focusing images with a long depth of field. In other words, the embodiment of FIG. 10, if it has sufficient light, can image objects from near distances of just a few inches up to infinity without the need for providing different or adjustable optics 118. The image generated by the optics 118 is projected onto a CCD matrix 120. The CCD matrix generates an optical signal 122 that is transmitted to the image processing hardware 124. A zoom control device 126 generates a zoom control signal 128 that is transmitted to the image processing hardware 124. The processed image information 130 is then transmitted to a display 132 for viewing by the user. The display 132 may also include optical focusing elements (not shown) to focus the image of the display onto the user's eye.

The electronic scope 117 of FIG. 10 can be used in a fashion similar to a telescope to view objects such as documents for reading or other objects of long distances, such as signs, in the same fashion as a telescope. In this fashion, the user may hold the electronic scope 117 with the display 132 adjacent to the users eye to view images generated by the CCD matrix 120. The zoom control 126 is used to select portions of the image that are captured by the CCD matrix 120. The zoom control signals 128 are used by the imaging processing hardware 124 to determine the selected portions. The selected portions may comprise progressively smaller portions of the captured image on the CCD array 120 centered around the middle of the captured image. In this fashion, a progressively magnified image can be generated that is centered around the center of the image captured by the CCD matrix 120. Of course, selection of the selected portions is performed by generating control signals 128 using the zoom control 126.

As indicated above, the magnification of the image is based upon the viewing angle of the user on the display 132 divided by the viewing angle of the selected portion of the image produced by the CCD matrix 120. For example, if the CCD matrix 120 has a viewing angle of 10 degrees and the selected portion of the image generated by the CCD matrix 120 is 3 degrees, the viewing angle of the generated image is 3 degrees. This number is divided into the viewing angle of the user on the display 132 which is fixed by the optics of the display. Further, the viewing angle of the display 132 may be 30 degrees such that magnification of 10× can be generated with the 3 degrees viewing angle of the selected portion of the image on the CCD matrix 120.

As a practical implementation, it may be desirable to fix optics 118 so that field of view of the CCD matrix 120 is fixed at a predetermined value of between 6 degrees to 10 degrees. This allows the scope to be used in a hand held manner with an adequate amount of stabilization of the image. Assuming that the optics of the display 132 fixes the field of view for the user at values between 30 degrees and 40 degrees, this would produce magnifications of between 3× to 6.6× without zooming. If a selected portion of the CCD matrix 120 generates a field of view of 3 degrees, a magnification of between 10× and 13.3× can be produced on the display 132. Since it has been found that the field of view of less than 3 degrees does not allow for proper stabilization for handheld devices, magnifications in the order of 10× to 14× are the largest practically achievable magnifications assuming the largest field of view of the display is approximately 40 degrees. Magnifications of approximately 15× have been found to be median magnification for readers having low vision. This parameter sets the range of the fields of view for both the detector optics and display optics. Since the display optics are currently limited to approximately 40 degrees, and detector optics under 3 degrees field of view are very difficult to hold in a steady fashion, magnifications of approximately 14× can be achieved. Innovations in the display optics to increase the field of view to 45 degrees or greater will greatly enhance the ability of the electronic scope 117 of FIG. 10 to generate a steady and greatly magnified image.

Additionally, it has been determined that the desired field of view for both close and far imaging is approximately the same. For example, 1 inch at 18 inches provides the proper field of view for reading textual material, while 1 foot at 18 feet, which is the same ratio, provides the proper field of view for reading signs and other objects at a distance. Hence, zooming is not required when reading documents at close range or reading signs at a distance. This ratio provides a viewing angle of approximately 3 degrees.

Figure 11:
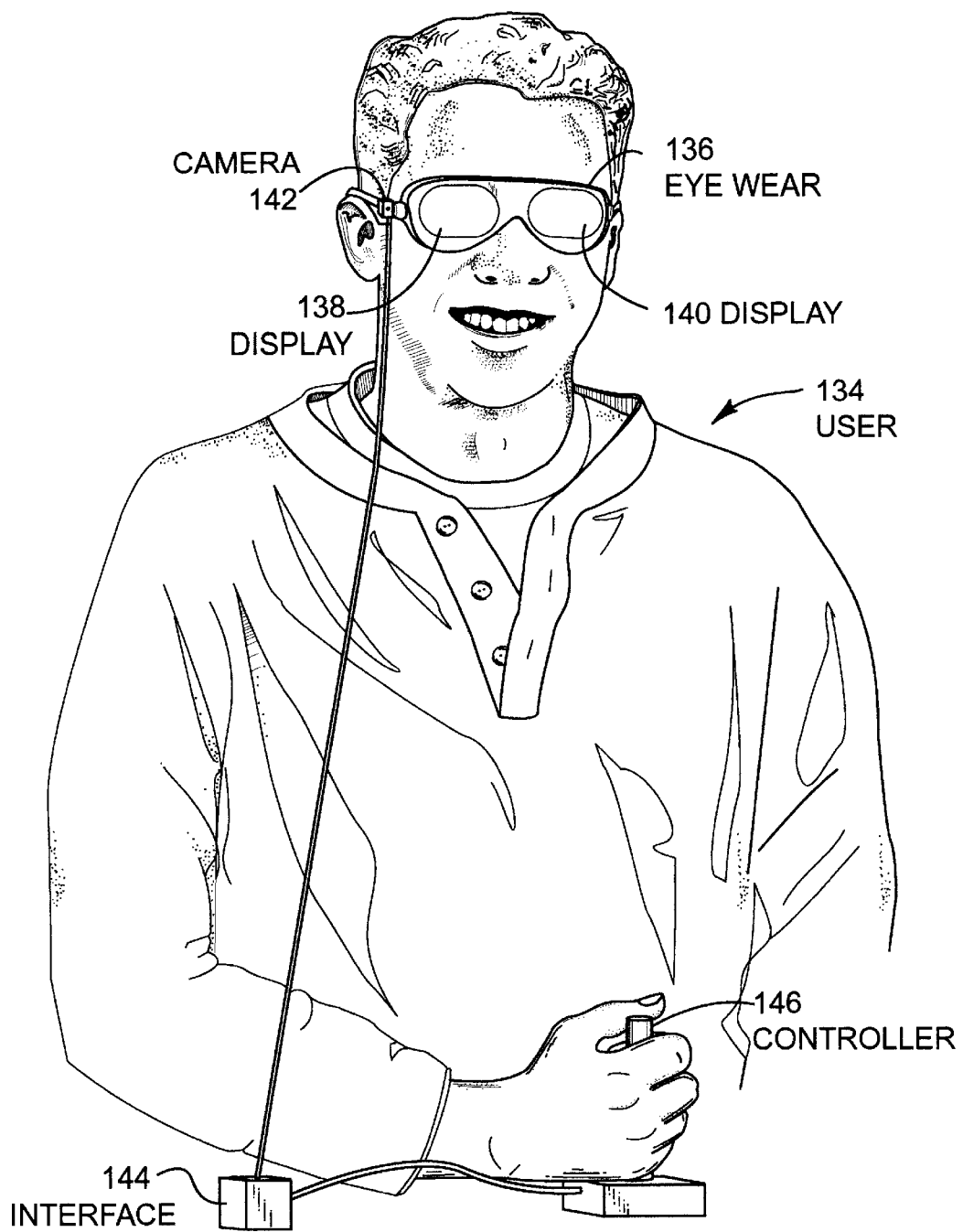
FIG. 11 is a schematic illustration of another embodiment of the present invention.

FIG. 11 is a schematic illustration of another embodiment of the present invention. As shown in FIG. 11, a user 134 is able to view magnified images using eyewear 136. Eyewear 136 includes displays 138 and 140 that are positioned in front of the user's eyes that include optics that allow the user 134 to focus on the images generated by the displays 138, 140. Eyewear 136 may be similar in appearance to standard sunglasses and provide a light and portable device for viewing enlarged images.

Eyewear 136 of FIG. 11 also includes a camera device 142 that is mounted on the side of the eyewear 136 and is directed in a forward direction to view the area in front of the user 134. The field of view of the camera 142 provides a fairly wide field of view for the purpose of panning the captured image, as set forth in more detail below. The camera 142 may comprise a very high resolution video camera that generates a high resolution image with a number of pixels. In this fashion, a large field of view can be provided by the camera 142 and very small selected portions can be selected for display, while maintaining an image on the displays 138, 140 that has sufficient resolution. In this fashion, panning can be accomplished across a wide field of view.

As also shown in FIG. 11, a belt mounted interface device 144 is connected to the camera 142. The interface device 144 is also connected to a manual controller 146. In the same fashion as described above, the image captured by the camera 142 can be panned and zoomed using the controller 146. If the camera 142 generates an image having a wide field of view, such as 45 degrees, the controller 146 can be used to pan across the entire captured image. In this fashion, the user 134 can view different portions of the image without moving his/her head. Since a very high resolution image is generated, a very small portion of the image can be selected to obtain the desired amount of magnification. Again, the field of view of the selected portion can be divided into the field of view of the display 138, 140 to determine the amount of magnification. If a selected portion of the image captured by the camera 142 has a field of view of 3.5 degrees, and the displays 138, 140 have a field of view of 35 degrees, a magnification of 10× can be produced. The field of view of 3.5 degrees in a captured image of 45 degrees will result in a small selected portion of the image that only uses approximately 12.5% of the number of pixels in the captured image. If the displays 138, 140 use a one-quarter VGA format, interpolation techniques can provide an image that still has a high degree of clarity.

By using a camera 142 in accordance with FIG. 11, that has a wide field of view, a wide range of panning can be provided in both vertical and horizontal directions. Of course, lower resolution cameras can be used with narrower fields of view that provide the same resolution image for the displays 138, 140. In that case, a smaller panning area would be provided, but the selected portions of the image would be larger to encompass more pixels.

The zooming and panning control of FIG. 11 can be provided directly on the interface device 144 or as a separate controller 146 coupled to the interface device as illustrated in FIG. 11. In any case, the manual operation of the controller 146 can provide both panning and zooming of the captured image in the manner desired by the user 134.

Figure 12:
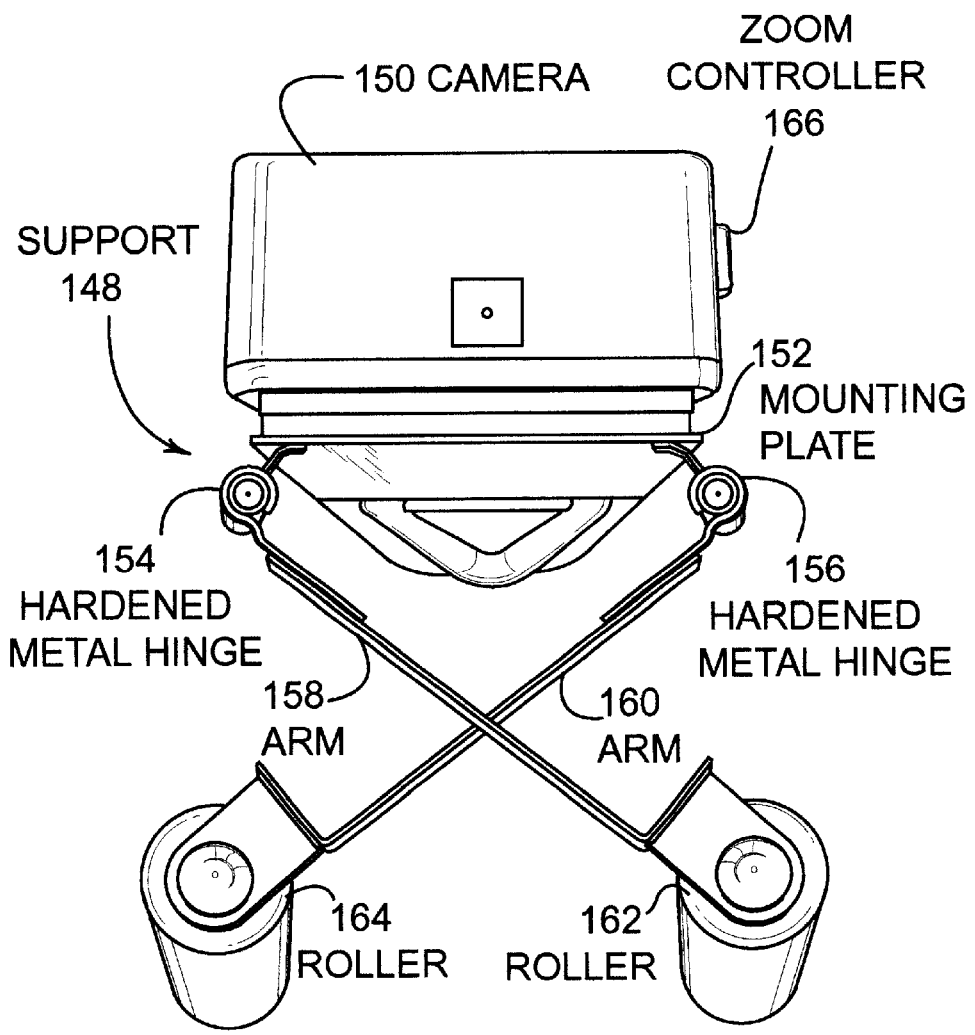
FIG. 12 is a schematic illustration of a support device that can be used with the long depth of field camera of the present invention.

FIG. 12 is a schematic illustration of a support 148 on which a small aperture camera 150 can be mounted. As shown in FIG. 12, the support 148 has a mounting plate 152 that can be releasably mounted to the camera 150. For example, a Velcro pad can be provided on the mounting plate 152 to attach to a velcro pad on camera 150. In this fashion, the camera 150 can be removed from the support 148 as desired. Hinges 154, 156 that use hardened metal are attached to the end portions of the mounting plate 152. Arms 158 and 160 are attached to hinges 154, 156, respectively. Arms 158, 160 are provided in an overlapping, crossed relationship as illustrated in FIG. 12. Rollers 162, 164 are attached to the lower portion of the arms 158, 160 respectively. Rollers 162, 164 allow the support to easily roll across a printed document to maintain a preselected height for the camera 150 above the document. The hinges of 154, 156 provide sufficient friction to maintain the arms of 158, 160 in a predetermined location while supporting the weight of the camera 150. Downward pressure can be applied on the camera 150 to adjust the hinges 154, 156 to position the camera 150 closer to the document on which the rollers 162, 164 are placed. Similarly, the arms 158, 160 can be manually adjusted to provide a greater distance between the document and the camera 150. This allows for easy adjustment for spacing of the camera from the document. A zoom controller 166 can also be provided on the camera 150 to adjust the magnification of the generated image in the manner described above.

The present invention therefore provides several embodiments that produce enlarged images that can be panned and adjusted for different magnification levels. This can be accomplished by using manual control devices or automatic control devices. Further, the present invention can be employed in a mobile device on the form of eyewear that is not bulky or unattractive. Further, in accordance with the present invention, an electronic scope can be provided that is capable of imaging at both short and long ranges and does not require focusing. In addition, the electronic scope can provide variable magnitude images using a zoom control device. Further, the present invention can employ a support device that is capable of holding a camera that can be manually scanned across a document at a predetermined level to provide a predetermined magnification.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of electronically enlarging a document with variable magnification and electronically panning said document and simultaneously allowing a user to write on said document comprising the steps of:

placing said document on a writing surface;

mounting a long depth of field camera on a stand above said writing surface in alignment with said document to provide sufficient space to write on said document;

generating a complete, in-focus image of said document from an output of said long depth of field camera;

displaying said image on a display;

providing a control device to electronically pan across said image and electronically vary said magnification of a portion of said image at different magnification levels.

2. The method of claim 1 wherein said step of providing a control device to electronically vary the magnification of a portion of said image further comprising the steps of:

capturing said portion of said image;

displaying said portion of said image as a full image on said display;

supplying missing pixels of said full image.

3. The method of claim 2 wherein said step of supplying missing pixels further comprises using interpolation techniques to supply said missing pixels.

4. The method of claim 1 wherein said step of providing said control device to electronically pan across said image further comprises the steps of:

capturing a portion of said image;

displaying said portion of said image on said display as a full image;

using said control device to capture a different portion of said image displaying said different portion of said image as a full image on said display.

5. A method of claim 1 wherein said step of providing said control device to electronically pan said image further comprises the steps of:

providing a control device that detects the location of an indicator and generates control signals that select portions of said document in accordance with said location of said indicator.

6. The method of claim 5 wherein said step of using a control device comprises the steps of:

using a camera to detect said indicator;

determining said location of said indicator;

moving the location of said selected portions of said documents in accordance with said location of said indicator.

7. A device for electronically generating a magnified image of an object to assist in viewing said object and writing on said object comprising:

a writing surface adapted for placement of said object;

a small aperture electronic camera that is capable of capturing a complete, in-focus image of said object;

a stand that holds said small aperture electronic camera in alignment with said writing surface, said stand providing sufficient space between said writing surface and said camera to allow a user to write on said object;

a display that displays said magnified image;

a controller that generates control signals relating to panning and magnification under the control of a user;

an interface device connected to said controller that electronically selects specific portions of said image captured by said camera in response to said control signals and modifies said specific portions for display as a full image on said display.

8. The device of claim 7 wherein said controller is a manual controller.

9. The device of claim 7 wherein said controller is an automatic controller.

10. The device of claim 7 wherein said display is a flat panel display.

11. The device of claim 7 wherein said display is a television.

12. The device of claim 7 wherein said controller comprises:

a detector that detects the location of an indicator attached to said user and generates said control signals in response to movement of said indicator.

13. A method of viewing objects with an electronic scope comprising the steps of:
- providing an elongated housing adapted to be handheld;
- providing a detector matrix on a first end of said elongated housing of said scope;
- focusing an image on said detector matrix using small aperture optics that provide a long depth of field;
- selecting a portion of said image using a hand operated zoom controller mounted on said elongated housing;
- displaying said portion of said image as a full image on a display located on a second end of said elongated housing;
- supplying missing pixels of said full image.

14. An electronic scope for generating an image of objects at both close and far distances and providing variable magnification of said image comprising:
- a handheld elongated housing;
- a detector matrix disposed at one end of said elongated housing that generates an electronic representation of said image;
- optics disposed adjacent to said detector matrix at said one end of said elongated housing to produce said image on said detector matrix, said optics providing a long depth of field that is sufficiently long to generate said image as an in-focus image on said detector for both reading documents at close distances and viewing objects at long distances;
- a zoom controller mounted on said elongated housing and adapted to be hand operated that selects a portion of said electronic representation of said image;
- a display disposed at another end of said elongated housing that generates a display image of said portion of said electronic representation of said image as a full image on said display;
- an image processor that selects said portions in response to said zoom controller and supplies missing pixels of said full image.

15. The electronic scope of claim 14 wherein said display comprises a CMOS detector matrix.

16. The electronic scope of claim 14 wherein said detector matrix comprising a CCD matrix.

17. The electronic scope of claim 14 wherein said zoom controller comprises a pair of buttons disposed on a housing of said scope.

18. The electronic scope of claim 14 wherein said zoom controller comprises a sliding switch disposed on a housing of said scope.

19. The electronic scope of claim 14 wherein said zoom controller comprises a rocker switch disposed on a housing of said scope.

* * * * *